United States Patent [19]

Griffin

[11] 4,137,784

[45] Feb. 6, 1979

[54] ELECTROMECHANICAL EQUIVALENT OF FLUID POWERED CYLINDER

[75] Inventor: James A. Griffin, San Rafael, Calif.

[73] Assignee: Industrial Device Corporation, San Rafael, Calif.

[21] Appl. No.: 851,229

[22] Filed: Nov. 14, 1977

[51] Int. Cl.² .............................................. F16D 3/26
[52] U.S. Cl. .................................. 74/89.15; 254/103; 74/25; 361/31
[58] Field of Search ...................... 74/89.14, 89.15, 25, 74/229; 254/103; 92/17; 335/285; 361/31

[56] References Cited

U.S. PATENT DOCUMENTS

| 2,321,828 | 6/1943 | Lane | 74/57 |
|---|---|---|---|
| 3,668,940 | 1/1976 | Sons | 361/31 |
| 3,873,066 | 5/1975 | Opyrchal | 254/103 |
| 3,932,789 | 6/1972 | Avena | 74/57 |
| 4,041,789 | 8/1977 | Hoback | 74/231 C |
| 4,048,662 | 9/1977 | Burguburu | 361/31 |

FOREIGN PATENT DOCUMENTS 1090290  11/1967  United Kingdom .................... 74/89.15

Primary Examiner—Samuel Scott
Assistant Examiner—Geralda Anderson
Attorney, Agent, or Firm—Townsend and Townsend

[57] ABSTRACT

Disclosed herein is an electromechanical actuator which acts as an analog of a fluid operated cylinder. A tubular piston moves along the axis of a fixed outer cylinder. One end of the piston is fitted with a threaded stud to which a clevis or other load attachment device can be attached. The other end of the piston, inside the outer cylinder, is attached to a coaxial drive nut. The drive nut is threaded onto a coaxial lead screw which passes through the drive nut and clears the inside of the piston. The drive nut is notched at a plurality of locations, the notches corresponding to a plurality of axially extending protrusions on the inside of the outer cylinder. Thus, when the lead screw is rotated, translational motion is imparted to the drive nut due to its inability to rotate relative to the outer cylinder. A small bar magnet is affixed to the drive nut and cooperates with an external reed switch to provide intermediate shutoff points. A double acting elastomeric spring fitted to the non-driven end of the lead screw is put in compression at either end of the piston's travel. The spring provides a gradually increasing loading on the motor which makes it feasible to use the increased motor current to sense the end of travel. Thus, the end of travel detection associated with the motor control can be carried out remote from the actuator itself, thereby allowing the use of reliable solid state electronics.

9 Claims, 6 Drawing Figures

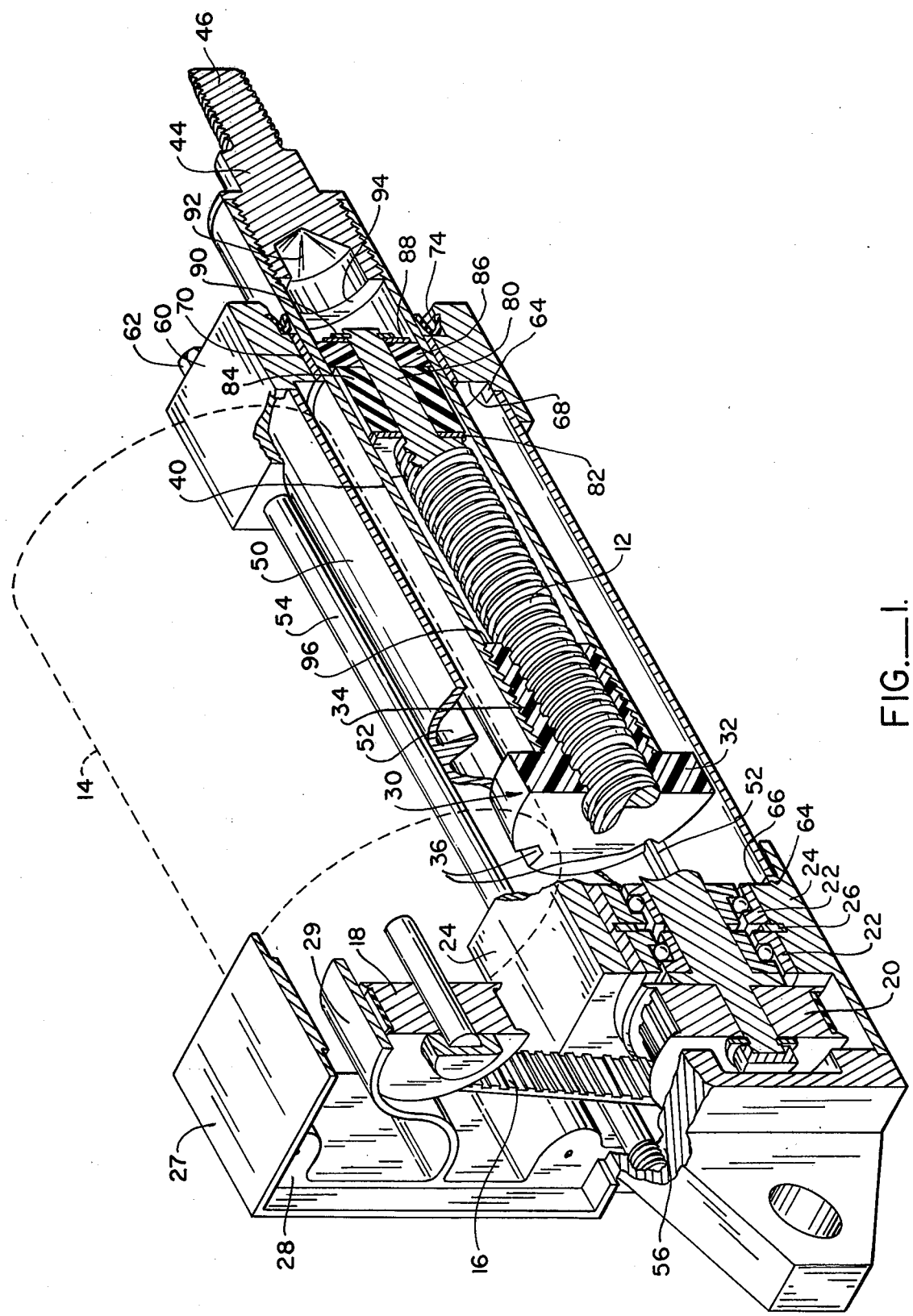
FIG._1.

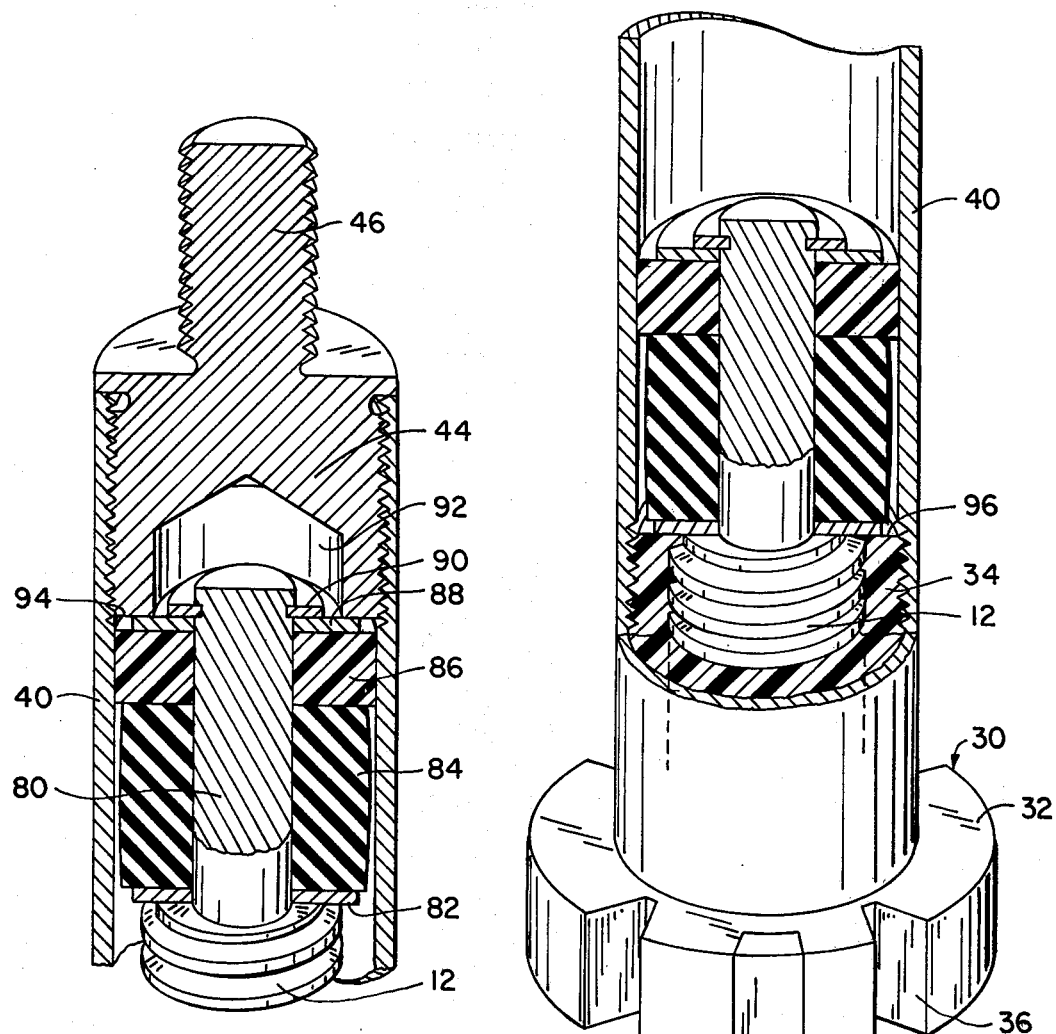
FIG._2a.
FIG._2b.
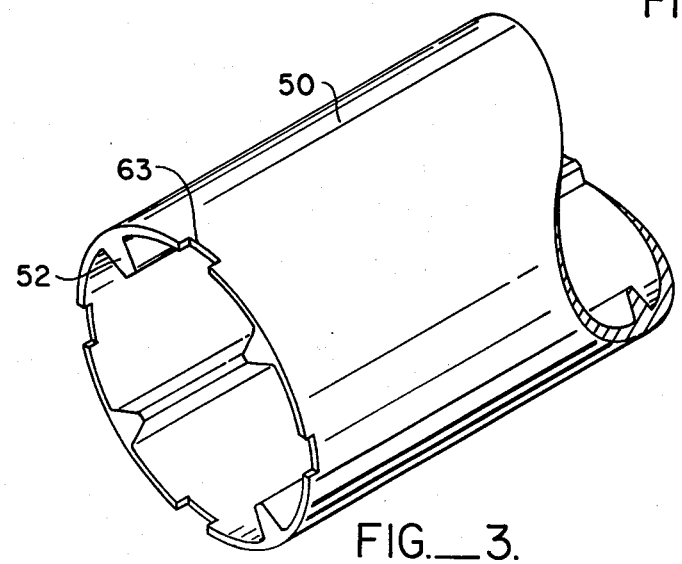
FIG._3.

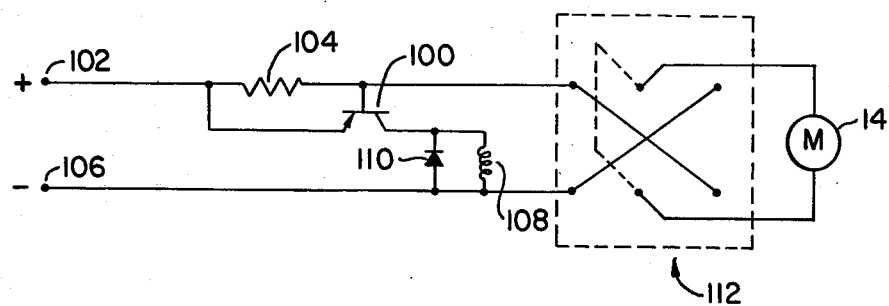
FIG._4.
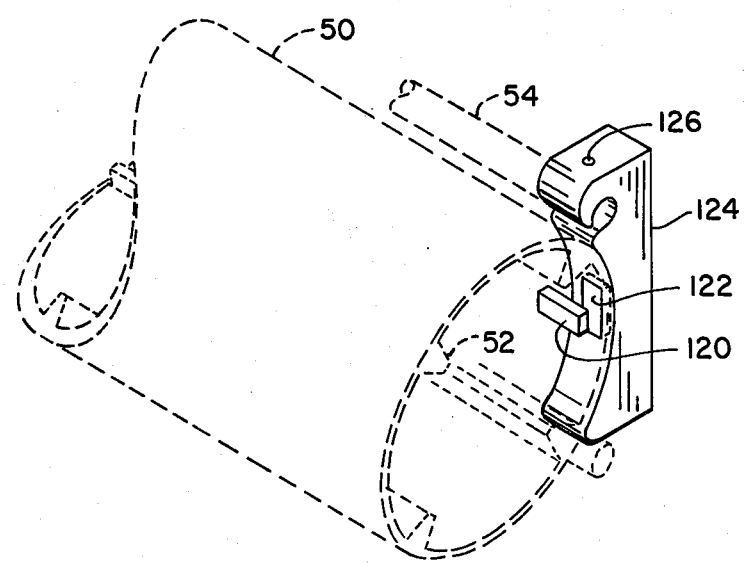
FIG._5.

ELECTROMECHANICAL EQUIVALENT OF FLUID POWERED CYLINDER

BACKGROUND OF THE INVENTION

This invention relates to electromechanical actuators of the screw driven variety. The prior art discloses a number of electrically driven screw operated jacks, Roos U.S. Pat. No. 1,324,851 and Hott U.S. Pat. No. 1,811,629 being typical. An electric motor is used to drive a lead screw which is threaded into a tubular piston-like member which is prevented from rotating when the screw is turned. Thus, rotation of the lead screw imparts a translational motion to the piston-like member. Devices based on the same principles of operation but adapted to a wider variety of installations have been developed. In principle, these so-called actuators could be used wherever a fluid operated cylinder and piston could be used. An electromechanical system is often preferable since it is relatively self-contained and does not require hoses, pumps, or messy fluids. Without fluid seals to maintain, the electromechanical devices are more reliable.

A major area of concern with electromechanical actuators is the provision of means for detecting the travel of the piston at its limits and shutting off the motor. Failure to do this can result in mechanical jamming of the device and/or burning out of the motor as a result of its being stalled.

A common method of shutting the motor off at the end of the piston's travel uses a limit switch inside each end of the actuator's outer housing. The use of the limit switches in this manner presents several difficulties. The switches' inherent unreliability is enhanced by the fact that the switches are within the physical confines of the actuator and are thus subjected to extremes in ambient conditions and applied stresses due to the rugged environment in which the actuator is likely to be used. The failure of a switch can lead to jamming of the device as well as motor burn out. Even if no additional damage to the actuator is caused by the failure of the switch, the actuator is rendered inoperable and must be disassembled, possibly requiring actual removal from its environment.

A further difficulty with locating limit switches at each end of the outer housing is that both ends of the housing are required to possess relatively complicated structure. This makes it impossible to provide an actuator whose length can be easily varied by simply cutting the housing and other associated parts, since both ends of the original housing are critical to the proper functioning of the actuator. In addition, the structure necessary for the switches provides a constraint which makes it difficult or impossible to tailor the external dimensions of the actuator to a desired configuration such as making them conform to standardized dimensions for pneumatic and hydraulic cylinders. Therefore, it is very difficult to replace existing fluid operated devices by electromechanical actuators to achieve the benefits of simplicity and increased reliability.

A number of prior art actuators do not actually prevent the drive nut from rotating, but rather rely on the load itself to prevent rotation relative to the outer housing. Under extreme loading conditions such as might occur at end of travel or under overloading of the device, an increased tendency of the drive nut and piston to rotate occurs. A conventional way of handling this problem is to provide an overload clutch between the load attachment point and the piston. This had the disadvantage of allowing the load point and the attachment point to rotate relative to one another.

Alternate methods of guiding the piston include using a piston of square cross section or a keyway and pin configuration. Sealing the device to exclude dirt from the inside is difficult with both these arrangements.

SUMMARY OF THE INVENTION

Disclosed herein is an electromechanical actuator which acts as an analog of a fluid operated cylinder. A tubular piston moves along the axis of a fixed outer cylinder. One end of the piston is fitted with a threaded stud to which a clevis or other load attachment device can be attached. The other end of the piston, inside the outer cylinder, is attached to a coaxial drive nut. The drive nut is threaded onto a coaxial lead screw which passes through the drive nut and clears the inside of the piston. The drive nut is notched at a plurality of locations the notches corresponding to a plurality of axially extending protrusions on the inside of the outer cylinder. Thus, when the lead screw is rotated, translational motion is imparted to the drive nut due to its inability to rotate relative to the outer cylinder. A small bar magnet is affixed to the drive nut and cooperates with an external reed switch to provide intermediate shutoff points.

A double acting elastomeric spring fitted to the non-driven end of the lead screw is put in compression at either end of the piston's travel, thereby performing the following functions. First, jamming which would occur if a rigid stop were used is prevented so that the screw can release when the direction of rotation is reversed. Second, the spring provides a gradually increasing loading on the motor which makes it feasible to use the increased motor current to sense the end of travel. Thus, the end of travel detection associated with the motor control can be carried out remote from the actuator itself, thereby allowing the use of reliable solid state electronics.

Two unexpected results follow from the use of the elastomeric spring and the external sensing means. First, doing the end of travel sensing remote from the device itself relieves a constraint on the configuration and allows designs which would otherwise be impractical or impossible. In particular, it becomes possible to construct the device so that its external dimensions are compatible with standardized fluid operated devices.

Second, since the specialized structure at the ends of the outer cylinder that would be necessitated by the use of limit switches is no longer necessary, it is possible to construct a device whose length can be readily varied. In particular, both ends of the device are held to the outer cylinder by a plurality of threaded rods in tension loading the cylinder in compression. By the expedient of cutting the lead screw, the outer cylinder, the piston, and the tie rods, and performing minor machining operations a production unit can be easily tailored to any preselected length.

OBJECTS AND ADVANTAGES OF THE INVENTION

It is an object of this invention to provide reliable means for sensing the end of travel of the piston of an electromechanical actuator and for turning off the motor when the end of travel is detected. This is accomplished by using a single elastomeric spring located on the lead screw, the spring being put in compression at both ends of the piston's travel. The consequential increase in motor current is sensed and used to stop the motor.

A first advantage of using an elastomeric spring is that jamming is less likely to occur than if a rigid stop were used.

A second advantage of using an elastomeric spring is that the motor current is increased gradually so that the motor current itself may be used to detect the end of travel.

An advantage of using motor current sensing to detect end of travel is that highly reliable solid state circuitry provides feasible detection means.

A second advantage of using motor current sensing to detect end of travel is that the same means that detect end of travel also are sensitive to overload conditions that could damage the driven mechanism or the actuator itself.

A third advantage of using motor current sensing to detect end of travel is that limit switches located physically within the actuator where they would be increasedly susceptible to failure are no longer necessary. Thus, the device reliability is increased. Moreover, the need to disassemble the actuator to remedy such failures is obviated since the sensing and shutoff means are external.

Accordingly, it is also an object of the invention to provide means remote from the actuator for sensing the end of travel of the piston. A single elastomeric spring within the actuator causes a gradual increase in motor current so that external current sensing means may be used to shut off the motor.

An advantage of using the single spring in conjunction with external current sensing means is that great flexibility in configuration is achieved.

Accordingly, a further object of the invention is to provide end of travel sensing means that do not necessitate specialized structure at both ends of the outer cylinder. This is accomplished by eliminating the need for limit switches and using the motor current to sense the end of travel.

An advantage of eliminating special structure at both ends of the outer cylinder is that the actuator can be more readily tailored to its intended environment.

It is therefore an object of the invention to provide an electromechanical actuator whose length can be easily adjusted. This is achieved by using an outer cylinder loaded in compression by tie rods in tension. A variable length is achieved by merely cutting the lead screw, the outer cylinder, the piston, and the tie rods, and performing minor machining operations.

An advantage of the variable length feature is that both the manufacturer and the ultimate user can perform the overall shortening operation.

It is a further object of this invention to provide an electromechanical actuator whose external dimensions conform to standardized dimensions for fluid operated devices. This is made possible once the constraint imposed by the specialized structure necessary to provide limit switches at both ends is removed.

An advantage of providing standardized dimensions is that the electromechanical actuator of this invention can easily be substituted for its hydraulic or pneumatic counterparts, thus affording the user the benefits of avoiding the problems associated with pumps, plumbing, and fluid seals.

It is yet a further object of this invention to provide a guided drive nut. The drive nut is notched at a plurality of locations on its circumference, and the notches cooperate with corresponding axially extending protrusions along the inner surface of the outer cylinder.

A first advantage of guiding the drive nut is that the need for an overload clutch is avoided. Thus, relative rotation between the load attachment point and the anchored point of the actuator is prevented.

A second advantage of guiding the drive nut is that it is no longer necessary to guide the piston. Therefore, a round piston which is much easier to seal against dirt than a square or keyed piston can be used.

A third advantage of guiding the drive nut is that a small bar magnet may be mounted on the drive nut to be used in conjunction with an external reed switch to provide intermediate shutoff points.

A fourth advantage of guiding the drive nut is that no torque loading is imparted to the driven mechanism.

Other objects and advantages of this invention will become clearer upon reading the following specification.

BRIEF DESCRIPTION OF THE DRAWINGS

FIG. 1 is a partially cut-away perspective view of the actuator, showing the arrangement and construction of the major components.

FIG. 2a is a partially cut-away perspective view showing the elastomeric spring compressed by the load attachment plug when the movable inner cylinder is fully retracted.

FIG. 2b is a partially cut-away perspective view showing the elastomeric spring compressed by the drive nut when the movable inner cylinder is fully extended.

FIG. 3 is a perspective view of one end of the outer guide cylinder, showing the alignment notches and the nut-guiding protrusions.

FIG. 4 is a schematic of a typical circuit suitable for shutting off the motor current when it reaches a certain level.

FIG. 5 is a perspective view showing a longitudinally adjustable reed switch holder mounted on the exterior of the actuator.

DESCRIPTION OF THE PREFERRED EMBODIMENT

FIG. 1 shows the inter-relationship of the major components of the actuator. Lead Screw 12 is driven by motor 14, shown in phantom, the rotary motion of which is transmitted by belt 16 which fits around motor pulley 18 and lead screw pulley 20. Motor 14 is typically a standard manufacture item, chosen on the basis of required output and available input power. A high efficiency 24 volt DC, permanent magnet motor is used to enable adjustable speed and dynamic braking while avoiding requirements of wiring with rigid conduits. Radial and axial thrust are taken up by bearings 22 mounted within bearing block 24. Snap ring 26 fits within a corresponding recess in bearing block 24 to take up the axial thrust. Bearings 22 are standard manufacture antifriction ball bearings such as deep groove super conrad bearings or, for heavier loads, angular contact bearings and are within bearing block 24 by a light press fit.

Attached to bearing block 24, and preferably constructed as part of the same integral aluminum casting, is square channel member 27. Channel member 27 presents oppositely facing mounting sites, each of which has four bolt-receiving pads 28 so as to be capable of having a square plate mounted thereto. Channel member 27 is placed so that it is symmetrical with respect to the midplane of pulley 20. Thus motor 14, which is attached to a square mounting plate, can be mounted facing in either direction along an axis parallel to that of lead screw 12. The mounting site not occupied by motor 14 has a cover plate (not shown) mounted to it. The wires bringing electrical power to motor 14 typically pass out through a hole in the motor's mounting plate and through a hole in the cover plate. Thus channel member 27 also serves as a self-contained junction box. Shield 29 within channel member 27 protects belt 16 and pulleys 18 and 20 from fouling by these motor wires as well as from dirt that may enter through the hole in the cover plate.

Pulleys 18 and 20 are notched at regularly spaced intervals along their circumference, and belt 16 has transverse ridges at a corresponding spacing so as to fit within the notches. In this way, belt slippage is avoided without necessitating severe radial loading of either the motor shaft or the lead screw.

Drive nut 30, preferably fabricated out of bearing quality plastic such as lubricated polyacetal resin manufactured by the E. I. Dupont de Nemours and Company under the trademark Delrin, is threaded onto lead screw 12. Drive nut 30 has a relatively large diameter cylindrical portion 32 and a smaller diameter cylindrical portion 34. The periphery of portion 32 has a plurality of notches 36, preferably four in number. Portion 34 is threaded on its outside.

Movable inner cylinder 40, hereinafter referred to as "piston", is a hollow stainless steel tube (typically of 1-inch diameter) threaded internally at both its ends. One end is threaded onto portion 34 of drive nut 30; the other threaded end receives load attachment plug 44. Load attachment plug 44 terminates in a threaded stud 46 capable of being fitted to a variety of load attachment devices such as clevises and the like. Piston 40 surrounds lead screw 12.

Outer guide cylinder 50, shown in detail in FIG. 3, is a hollow aluminum tube that surrounds drive nut 30, piston 40 and lead screw 12. The inner surface of guide cylinder 50 has a plurality of axially extending protrusions 52 corresponding to the notches on portion 32 of drive nut 30, so that drive nut 30 is free to slide along the axis of guide cylinder 50, but not rotate relative to guide cylinder 50. The inner diameter of guide cylinder 50 is slightly larger than the outer diameter of portion 32 of drive nut 30. Guide cylinder 50 is preferably on aluminum extrusion having 4 guide teeth. Any spline tooth form could be used, the choice typically depending on the availability of cutters. One form that has been found suitable is American National Standard 12 diametrical pitch involute gear tooth, 20° pressure angle basic rack tooth form. This is cut on 1.417 pitch diameter with a root diameter of 1.625", an inside diameter of 1.25", and an outside diameter of 1.75".

The entire assembly is held together by a plurality of tie rods 54, preferably 4 in number, that are located outside guide cylinder 50. Each tie rod 54 is threaded at both its ends. One end of tie rod 54 passes through a hole in bearing block 24 and is threaded into cap 56 which may have a clevis cast on as shown. Tie rod 54 could equally well pass through a hole in cap 56 and be held in place by a nut.

The other end of rod 54 passes through a hole in head 60 and has nut 62 threaded thereonto. In this fashion, tie rods 54, themselves loaded in tension, load guide cylinder 50 in compression. Cap 56 and head 60 are preferably aluminum castings.

In the preferred embodiment, the diameter of guide cylinder 50 and the dimensions of anchor clevis 56, bearing block 24, and end cap 60 are chosen so that the external dimensions of the actuator conform to the NFPA's standardized dimensions for pneumatic and hydraulic cylinder and piston devices.

Relative rotation between guide cylinder 50 and bearing block 24, and between guide cylinder 50 and head 60 is prevented by a plurality of notches in the end of the walls of guide cylinder 50 and a corresponding plurality of protrusions 64 extending from surface 66 on bearing block 24 and surface 68 on head 60, which surfaces guide cylinder 50 bears against.

Head 60 is fitted with a solid bearing 70 made from bearing quality plastic to provide lateral support for piston 40. Adjacent to bearing 70 and located toward the outside is plastic wiper seal 74 which keeps lubricant from leaking out of the device and dirt from entering within the device.

At this point, the overall operation of the device can be understood. As motor 14 imparts its rotational motion to lead screw 12, drive nut 30, which is prevented by protrusions 52 from rotating relative to guide cylinder 50, has imparted to it translational motion along the common axis of lead screw 12, drive nut 30, piston 40 and guide cylinder 50. Since piston 40 is rigidly attached to drive nut 30, the translational motion of drive nut 30 is transmitted to piston 40. Thus piston 40 extends from guide cylinder 50 or retracts into guide cylinder 50, depending on the direction of rotation of motor 14.

Typical performance of the actuator with a 1/10 hp motor covers the range between 60 lbs. thrust at an extension rate of 6 inches/second to 600 lbs. thrust at an extension rate of 0.5 inches/second.

The non-driven end of lead screw 12 has an unthreaded portion 80, onto which are fitted washer 82, elastomeric spring 84, bearing quality plastic guide 86, and washer 88, all of which are held in place by snap ring 90. Guide 86 helps maintain the coaxial alignment between lead screw 12 and piston 40. Elastomeric spring 84 is, in the preferred embodiment, a rubber bushing. When the piston is at neither end of its travel, elastomeric spring 84 is extended so that washer 82 bears against the end of the threaded portion of lead screw 12 while washer 88 is against snap ring 90.

FIGS. 2a and 2b illustrate the manner in which elastomeric spring 84 is compressed at both ends of the piston travel. FIG. 2a shows piston 40 at its most retracted position. Load attachment plug 44 has a central recess 92 which is of a sufficient diameter to clear snap ring 90 but not large enough to clear washer 88. Recess 92 leaves a shoulder 94 which thus abuts against washer 88. When shoulder 94 bears against washer 88 and guide 86 which are both free to slide along unthreaded portion 80, elastomeric spring 84 is compressed against washer 82.

FIG. 2b shows the elastomeric spring when the piston is at its maximum extension. In this position, threaded portion 34 of drive nut 30 presents a surface 96 which bears against washer 82. Thus elastomeric spring 84 is compressed against guide 86, itself relatively incompressible, and washer 88.

The compression of elastomeric spring 84 at either end of the travel of piston 40 causes an additional loading on motor 14 which manifests itself by a greater current drawn by motor 14. The increase in motor current is more gradual than would occur if non-resilient end of travel occurred. By providing a cushioned stop at both ends of travel, mechanical jamming of drive nut 30 on lead screw 12 is avoided.

The increased current drawn by motor 14 could, if allowed to continue flowing through the stalled motor, cause the motor winding to burn up. Therefore, it is necessary to provide apparatus, preferably located at the site of the power supply, for sensing the increased motor current and shutting off the power to the motor. Even if the motor windings did not burn up due to the increased current draw, the likelihood of mechanical jamming between lead screw 12 and drive nut 30 would be enhanced, notwithstanding the use of elastomeric spring 84. An increase in motor current may also reflect an over-loaded condition where the piston is at neither end of its travel. Although mechanical jamming is not a problem here, motor burn-out is.

A simple way of shutting off the motor current when it reached a certain level would be to have a relay in series with the motor power supply. This has the disadvantage that the motor current would flow through the relay at all times, including the majority of the time when the current was not at its increased level. The relay in series with the motor would also be called upon to switch rather substantial currents, with an accompanying unreliability and component failure due to arcing contacts and the like. FIG. 4 illustrates a simple circuit which utilizes a transistor to switch current to a relay only when the motor current reaches a certain value.

A circuit using a PNP transistor such as a type 2N2905 is described, but an NPN transistor circuit could be used equally well. The emitter of transistor 100 is connected to the positive terminal 102 of the motor power supply. The base of transistor 100 is connected to one terminal of motor 14, and the other terminal of motor 14 is connected to negative terminal 106 of the motor power supply. Resistor 104 is connected between the base and emitter of transistor 100. Relay 108 which is arranged to shut off motor power is connected between the collector of transistor 100 and the negative power supply terminal. Diode 110, which may be type IN4007, is connected across relay 108. Double pole double throw switch 112 allows the motor current to be reversed.

The value of resistor 104 is chosen so that under normal current flow conditions the voltage drop across resistor 104 will be insufficient to cause transistor 100 to conduct. A .5 ohm 25 watt resistor is suitable for a typical application. An increase in motor current to the level at which it is desired to turn off the power supply results in a voltage drop across resistor 104 sufficient to cause transistor 100 to conduct. The conduction through transistor 100 causes current to flow through relay 108, thereby effecting the desired shut-off. Relay 108 only has current flowing through it for a time long enough to turn off the power supply. Moreover, the current flowing through relay 108 need only be a small fraction of the motor overload current. Diode 110 is a damper diode to protect the circuit from transients that occur when the power supply is turned off.

The use of the single elastomeric spring located within the piston in conjunction with external current sensing apparatus, and the tie-rod construction provides an actuator whose length can be easily varied. The stroke length of the actuator will depend upon the lengths of lead screw 12, piston 40, guide cylinder 50, and tie rod 54. By cutting these pieces to proper lengths from stock of arbitrary length, the manufacturer of an actuator according to this invention can supply a device with stroke length to suit any customer's needs without having to maintain a supply of parts only suitable for actuators of a given stroke length. Additionally, the owner of an actuator having a given stroke length can rebuild it to have a shorter stroke length quite easily. Tie-rods 54 are cut down by the desired decrease in length and the cut end of each is re-threaded. Guide cylinder 50 is cut down by the desired shortening and the cut end has new notches 63 made. Piston 40 is cut down by the desired shortening and the cut end is re-threaded internally. Lead screw 12 is cut down from the end having elastomeric spring 84 on it by an amount corresponding to the desired degree of shortening. A new non-threaded portion 80 is machined with a groove to retain snap-ring 90. The actuator is then reassembled and ready for use in its new shortened configuration.

While it is relatively easy to shorten the stroke of the actuator, as described above, it is sometimes desired to make such a shortening temporary or changeable. As shown in FIG. 5, a small bar magnet 120 is mounted on drive nut 30 so as to be as close as possible to the wall of guide cylinder 50. Thus magnet 120 is located between an adjacent pair of notches 36. Since guide nut 30 cannot rotate relative to guide cylinder 50, a magnetic reed switch 122 mounted to the outer surface of guide cylinder 50 can be used to externally sense the position of drive nut 30. Thus, the state of reed switch 122 can be communicated to external circuitry and be used to turn off motor current even though the current has not reached the normal level at which it is turned off. To achieve precise circumferential registration, reed switch 122 is mounted within reed switch holder 124, preferably made of aluminum. Switch holder 124 is contoured so that one end fits around a tie-rod, and the surface near which reed switch 122 is mounted contacts the outer surface of guide cylinder 50. Thus switch holder 124 is free to slide along the tie-rod to which it is mounted while maintaining reed switch 122 in precise registration. The axial position of switch holder 124 can be maintained by use of set screw 126 which, when tightened, prevents axial movement.

What is claimed:

1. In an electromechanical actuator for taking the rotational motion of an electric motor and varying the spacing between two actuator ends from a first close disposition to a second spaced disposition; said actuator including an electric motor having a current input and rotating power output; a rotating and threaded lead screw attached for rotation with respect to one of said actuator ends; a drive nut having threads complementary to said lead screw; means for linking said drive-nut to the other of said actuator ends; a casing having said electric motor mounted thereto; means within said casing for preventing relative rotation between said casing and said drive nut, whereby axial movement of said drive nut along said lead screw occurs upon rotation of said lead screw; transmission means generally at one end of said lead screw for transmitting said rotating power output of said motor to rotate said lead screw; improved end of travel sensing means comprising: single spring means surrounding a portion of said lead screw for energy absorbing compression upon movement of said actuator ends to either of said first or second dispositions to impart to said electric motor through said transmission means an increasing load upon movement of said actuator to either of said first or second dispositions; current sensing means attached to said current input of said electric motor for detecting change of current due to said increasing load; and current interrupting means connected to said current input and responsively communicated to said current sensing means for interrupting said current upon said increase in current due to said increase in load, said end of travel sensing means being devoid of limit switches inside said casing.

2. The actuator of claim 1 also comprising compression means linked to said other end of said actuator, and wherein said lead screw has an unthreaded portion at the end remote from said transmission means, and wherein said spring means comprises an elastomeric spring surrounding said unthreaded portion and retained thereon, wherein said drive nut compresses said elastomeric spring when said actuator is at said spaced disposition and wherein said compression means compresses said elastomeric spring when said actuator is at said close disposition.

3. The actuator of claim 1 wherein said drive nut has a plurality of axially extending notches and wherein said means for preventing relative rotation comprises a plurality of axially extending protrusions within said casing, said protrusions complementary with said notches.

4. The invention of claim 1 wherein said rotating power output is about an axis parallel to said lead screw, and wherein said casing includes a channel member having first and second spaced oppositely facing mounting surfaces adapted to receive and support said motor such that said motor extends along first and second oppositely directed axes depending on which of said first and second mounting surfaces, respectively, said motor is mounted to.

5. The actuator of claim 1 wherein said means for linking said drive nut to said other actuator end is a hollow inner cylinder coaxial with said lead screw, and wherein said casing comprises an outer hollow cylinder coaxial with said lead screw, a head abutting said outer cylinder at its end farthest from said transmission means, a cap remote from said head, and means for holding said head and said cap in spaced relation with said outer cylinder therebetween.

6. The actuator of claim 5 wherein said holding means comprises a plurality of tie rods between said cap and said head, whereby said actuator may be shortened by a predetermined decrement by shortening said lead screw by said decrement, shortening said outer guide cylinder by said decrement, shortening said inner moveable cylinder by said decrement, and shortening said tie rods by said decrement.

7. The actuator of claim 1 also comprising: a magnet attached to said drive nut; a magnetic reed switch; means for maintaining said reed switch at an azimuthal position on the exterior of said casing corresponding to the azimuthal position of said magnet on said drive nut; and means for sensing the state of said reed switch and shutting off said current input when said reed switch and said magnet are at their minimum separation; whereby a change in the axial location of said reed switch leads to a change in the effective stroke length of said actuator.

8. An electromechanical actuator for taking the rotational motion of an electric motor and varying the spacing between first and second actuator ends from a first close disposition to a second spaced disposition comprising:

an electric motor including a current input and a rotating power output;

a rotating and threaded lead screw attached for rotation with respect to said first actuator end;

transmission means generally at one end of said lead screw for transmitting said rotating power output of said motor to rotate said lead screw, said lead screw having an unthreaded portion at the end remote from said transmission means;

a drive nut having threads complementary to said lead screw;

a hollow inner cylinder coaxially surrounding said lead screw, and linking said drive nut to said second actuator end;

compression means linked to said second actuator end;

a casing devoid of limit switches therein, and having said electric motor mounted thereto, said casing including a hollow outer cylinder coaxially surrounding said lead screw and said hollow inner cylinder, a head abutting said outer cylinder at its end farthest from said transmission means, a cap remote from said head, and a plurality of tie rods holding said head and said cap in spaced relation with said outer cylinder therebetween;

means within said casing for preventing relative rotation between said casing and said drive nut, whereby axial movement of said drive nut along said lead screw occurs upon rotation of said lead screw;

spring means surrounding said unthreaded portion on said lead screw and retained thereon, wherein said drive nut compresses said spring means when said actuator ends are at said spaced disposition and wherein said compression means compresses said spring means when said actuator ends are at said close disposition, said spring means imparting to said electric motor through said transmission means an increasing load upon movement of said actuator to either of said close or spaced dispositions;

current sensing means attached to said current input of said electric motor for detecting change of current due to said increasing load; and current interrupting means connected to said current input and responsively communicated to said current sensing means for interrupting said current upon said increase in current due to said increase in load;

such that movement of said actuator ends to either of said close or spaced dispositions is detected, and movement interrupted, despite said casing's being devoid of limit switches therein;

said casing's being devoid of limit switches therein further facilitating a shortening of said actuator wherein said actuator may be shortened by a predetermined decrement by shortening said lead screw by said decrement, shortening said outer cylinder by said decrement, shortening said inner cylinder by said decrement, and shortening said tie rods by said decrement.

9. The invention of claim 8 wherein said rotating power output is about an axis parallel to said lead screw, and wherein said casing includes a channel member having first and second spaced oppositely facing mounting surfaces adapted to receive and support said motor such that said motor extends along first and second oppositely directed axes depending on which of said first and second mounting surfaces, respectively, said motor is mounted to.

* * * * *